Patented Apr. 18, 1939

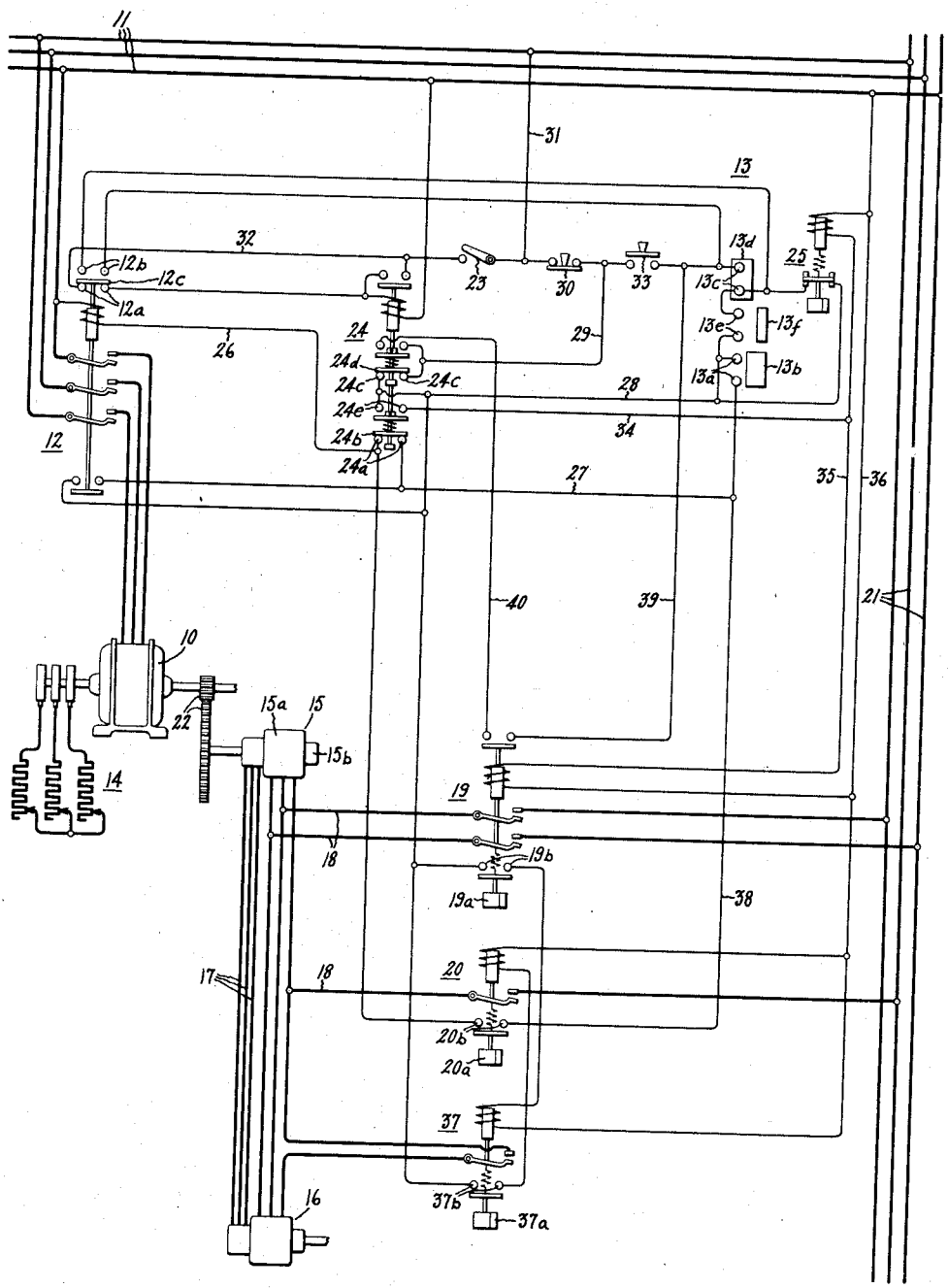

2,155,268

UNITED STATES PATENT OFFICE 2,155,268

CONTROL SYSTEM

Gerhart W. Heumann, Schenectady, N. Y., assignor to General Electric Company, a corporation of New York Application February 17, 1937, Serial No. 126,217

6 Claims. (Cl. 172—293)

This invention relates to control systems, more particularly to systems for controlling the operation of electric motors, and it has for an object the provision of a simple, reliable and improved system of this character. More particularly, the invention relates to systems in which two separate loads or objects are required to be driven in synchronism with each other, and a more specific object of the invention is the provision of means for effecting the synchronization of the loads prior to starting the drive.

Another object of the invention is the provision of suitable selective control means for starting and driving one of the loads while maintaining the other inactive, or synchronizing and driving both loads in unison.

Still another object is the provision of means for insuring synchronization of both loads before one load can be started in response to actuation of the master switch, provided the synchronization has been initiated by a control device.

In carrying the invention into effect in one form thereof, one load is driven by a main motor and a second load is maintained in synchronism therewith by means of an electrical motion transmitting system, the transmitter of which is mechanically coupled to the main drive motor and the receiver of which is coupled to the load that is to be maintained in synchronism with the motor driven load. A master switch is provided for controlling the starting of the motor, together with a control relay and means controlled thereby for establishing excitation connections for the electrical motion transmitting system, and for preventing starting of the main motor in response to actuation of the master switch prior to establishment of the excitation connections.

In illustrating the invention in one form thereof, it is shown in a system that is particularly well adapted for driving a kiln and a feeder therefor in synchronism with each other. It will be understood, however, that the invention has other applications and may be utilized generally where two drives are tied together by an electrical motion transmitting system and where it is desired under certain conditions to shut down the motion transmitting system drive without shutting down the main drive.

For a better and more complete understanding of the invention, reference should now be had to the following specification and to the accompanying drawing, the single figure of which is a simple, diagrammatical illustration of an embodiment of the invention.

Referring now to the drawing, a load, such for example, as a rotary kiln, is driven by an electric motor 10 to the drive shaft of which it is coupled by suitable means. Although the motor 10 may be of any suitable type, it is illustrated as an alternating current motor of the wound rotor induction type, and is supplied from a suitable source represented by the three supply lines 11, to which it is arranged to be connected by suitable means illustrated as an electromagnetic line contactor 12. this contactor is under the control of a suitable master switch 13 which is illustrated as a drum type master switch having stationary fingers and movable segments.

The speed of the driving motor 10 may be varied by means of a variable resistance 14 connected to the slip rings of the motor 10. Any suitable means may be provided for varying this resistance. Usually, the master switch 13 will be provided with segments, fingers, and the necessary control devices controlled thereby for varying the resistance 14. However, since this feature constitutes no part of the present invention, it is therefore omitted from the drawing.

Assuming that the main motor 10 is utilized to drive a rotary kiln, it will be necessary at times to drive the kiln feeder in synchronism with the kiln. For this purpose, a suitable electrical motion transmitting system comprising an electrical motion transmitting device 15 and an electrical motion receiving device 16 is provided. These devices are each physically similar to a wound rotor induction motor. For example, the electrical motion transmitting device 15 comprises a stator member 15a having a polycircuit distributed winding (not shown) and a rotor member 15b likewise having a polycircuit distributed winding, and arranged in inductive relationship with the stator winding. Either the stator winding or the rotor winding may be the primary winding, and the other the secondary winding. However, in the arrangement disclosed, the stator winding is the primary winding and the rotor winding is the secondary winding.

The electrical motion receiving device 16 is similarly constructed and the terminals of its rotor winding are connected to corresponding terminals of the rotor winding of the transmitting device by means of conductors 17 whilst the stator windings of both transmitting and receiving devices are connected to the supply source 11 by means of conductors 18, switching devices illustrated as electromagnetic contacts 19 and 20, and conductors 21. When power is supplied to the primary windings of devices 15 and 16, and their secondary windings are connected together, as illustrated, the rotor members of both devices assume a position of correspondence, and when the rotor of one of the members is rotated, the rotor member of the other member is rotated a corresponding amount.

The rotor member of the transmitting device 15 is connected by means of suitable gearing 22 to the drive shaft of the main load driving motor 10, and the shaft of the receiving device 16 is mechanically coupled by suitable driving connections to the load that is to be driven in synchronism with the main load. In the kiln application mentioned, the shaft of the receiving device 16 is connected to the feeder.

If it is desired to drive the kiln alone while maintaining the feeder inactive or at rest, this may be accomplished by actuation of the master switch 13. On the other hand, if it is desired to drive the feeder in synchronism with the kiln, a control device, illustrated as a manually operated switching device 23, and a control relay 24 controlled by the manually operated switch 23 are provided. This control relay and the line contactor 12 are interlocked with each other and with the master switch so that if the manually operated switch 23 is actuated to the position for running the feeder, the main kiln driving motor 10 can not be started in response to actuation of the master switch 13 until the excitation connections between the primary windings of the transmitting and receiving devices and the source have been completed.

In addition, a time delay device 25 is provided for interrupting the excitation connections to the transmitting and receiving devices in the event that the master switch 13 is not actuated to start the main motor 10 within a predetermined interval of time after the excitation connections have been completed.

With the foregoing understanding of the elements and their organization, the operation of the system itself will readily be understood from the following detailed description. When the master switch 13 is in the central or off position in which it is illustrated, the apparatus is de-energized and at rest. Assuming that it is desired to run the kiln alone without running the feeder, the master switch is operated to its first position in which an energizing circuit is completed for the operating coil of the line contactor 12. This circuit extends from the lower side of the supply source 11 through the operating coil of contactor 12, conductor 26, lower stationary contacts 24a of the control relay bridged by the movable contact 24b, conductor 27, fingers 13a of the master switch bridged by segment 13b, conductor 28, stationary contacts 24c of the control relay bridged by movable contact member 24d, conductor 29, normally closed stop switch 30, and conductor 31 to the upper side of the supply source. Contactor 12 closes in response to energization and connects the motor 10 to the supply source 11, and motor 10 drives the kiln at a speed depending upon the setting of the rheostat 14.

If it is desired to run the feeder, the manually operated control switch 23 is actuated to its closed position. It will be observed, however, that the energizing circuit for the operating coil of the control relay 24 passes through the interlock contacts 12a of the line contactor 12. Consequently, as long as the line contactor 12 is in its closed position, the contacts 12a are open and the energizing circuit for control relay 24 can not be completed, and since the excitation connections for the motion transmitting system are under the control of the relay 24, the feeder can not be operated. It will also be observed that the energizing circuit for the line contactor passes through the intermediate normally closed contacts 24c of control relay 24 which open when relay 24 is energized. When these contacts are open, the energizing circuit for the line contactor can only be re-established by first operating the master switch to the off position. Furthermore, the energizing circuits for synchronizing contactors 19, 20 and 37 can only be completed in the off position of the master switch. Therefore, in order to run the feeder, it is first necessary to return the master switch 13 to its off position, and to depress the stop button 30 momentarily to interrupt the energizing circuit for the line contactor 12 which thereupon opens to disconnect the motor 10 from the supply source 11. Contactor 12 in opening completes an energizing circuit for the operating coil of control relay 24 that is traced from the lower side of the supply source 11, through the operating coil of relay 24, normally closed contacts 12a of line contactor 12, conductor 32, switch 23 and conductor 31 to the upper side of the supply source 11. Relay 24 closes in response to energization and in the closed position, its upper interlocks complete a holding circuit for the coil of the relay independent of the interlocking contacts of the line contactor 12. Relay 24 also opens its normally closed contacts 24a and 24c, and since the relay 20 is open at this time, the line contactor 12 can not be energized and closed even though the master switch 13 should be actuated to the running position.

To establish the excitation connections for the transmitting and receiving devices 15 and 16, the start button 33 is depressed and an energizing circuit established for the operating coil of contactor 19. This energizing circuit is traced from the upper supply line 11 through the stop button 30 and start button 33, fingers 13c of the master switch bridged by the segment 13d, normally closed contacts of time delay relay 25, conductor 28, stationary contacts 24e of relay 24 bridged by movable contact member 24b, conductors 34, 35, operating coil of contactor 19 and thence by conductor 36 to the lower side of the supply source. Contactor 19 responds and closes its main contacts to connect the primary windings of the transmitting and receiving devices 15 and 16 to one phase of the supply source. The establishment of the single phase connections serves to synchronize the rotors of the transmitting and receiving devices in positions of correspondence.

After an interval of time determined by the setting of the time element device 19a, contacts 19b are closed to complete an energizing circuit for the operating coil of contactor 37 in parallel with the operating coil of contactor 19. Contactor 37 closes its main contacts to connect the terminal of the third phase of the transmitter and receiver to each other, and after an interval of time determined by the setting of time element device 37a, contacts 37b are closed to complete an energizing circuit for the operating coil of contactor 20 which thereupon closes its main contacts to connect the third phase of the transmitter and receiver to the third phase of the supply source. The synchronization of the transmitter and receiver is now complete. After an interval of time determined by the setting of time element device 20a, auxiliary contacts 20b of contactor 20 are closed.

The master switch 13 may now be operated to its running position to complete an energizing circuit for the operating coil of the line contactor 12. This circuit is traced from the lower supply line 11 through the operating coil of contactor 12, conductor 26, contacts 20b of contactor 20, conductor 38, fingers 13a of the master switch bridged by segments 13b, normally closed contacts of time relay 25, fingers 13c of the master switch bridged by segment 13d, conductor 39, upper interlocks of contactor 19, conductor 40, upper interlocks of control relay 24, and thence through conductor 29, the normally closed contacts of stop button 30 and conductor 31 to the upper side of the supply source. In this connection it will be noted that segments 13b and 13d overlap. That is to say, segment 13b engages contacts 13a before segment 13b leaves contacts 13c. Line contactor 12 closes in response to energization and connects the motor 10 to the supply source 11, and both the kiln and the feeder are driven at a speed determined by the setting of the rheostat 14.

In the closed position of line contactor 12, upper interlock contacts 12b are closed by the movable contact member 12c, thereby to prevent interrupting the energizing circuit for the operating coil of contactor 12 when the segment 13d of the master switch finally leaves fingers 13c.

It will be noted that the operating coil of the time delay relay 25 is connected in parallel with the operating coil of contactor 19 and consequently, relay 25 opens its contacts a predetermined interval of time after contactor 19 is energized to establish excitation connections for the motion transmitting and receiving devices 15 and 16. If the master switch 13 has been operated to the running position prior to the opening of the contacts of the time relay 25, no circuits are interrupted because a parallel path about the contacts of the relay 25 is established through the fingers 13e of the master switch bridged by the segment 13f. However, if the master switch is not actuated to its running position to start the main driving motor 10 prior to the opening of the contacts of relay 25, the energizing circuit of contactors 19, 20, and 37 which were traced through the contacts of relay 25 will be opened, and these contactors will open their contacts to disconnect the transmitting and receiving devices from the source 11. Thereafter the system can not be restarted until the start button 33 is again depressed with the master switch 13 in its central or off position.

Although in accordance with the provisions of the patent statutes, this invention is described as embodied in concrete form, it will be understood that the invention is not limited to the specific elements and connections shown and described, since alterations and modifications will readily suggest themselves to persons skilled in the art without departing from the true spirit of the invention or from the scope of the annexed claims.

What I claim as new and desire to secure by Letters Patent of the United States, is:

1. A control system comprising in combination a main motor for driving a load, means for maintaining a second load in synchronism with said first load comprising an electrical motion transmitting device driven by said motor, an electrical motion receiving device mechanically connected to said second load and electrically connected to said transmitting device, a master switch having an off position and an operating position for controlling the starting of said main motor, a control relay and means controlled thereby for establishing excitation connections for said transmitting and receiving devices, and interlock means for preventing actuation of said relay to establish said connections except in said off position of said master switch thereby to prevent starting of said main motor by said master switch prior to establishment of said connections.

2. A control system comprising in combination, a motor for driving a main load, a master switch, and a line contactor controlled thereby for controlling the energization of said main motor, means for driving a second load in synchronism with said first load comprising an electrical motion transmitting device driven by said motor and an electrical motion receiving device mechanically connected to said second load and electrically connected to said transmitting device, an electroresponsive device and means controlled thereby for establishing excitation connections from said transmitting and receiving devices to a source of power, interlocking connections controlled by said line contactor for preventing actuation of said electroresponsive device to establish said excitation connections except in the open position of said line contactor and interlocking connections controlled by said connections establishing means for preventing closing of said line contactor until completion of said excitation connections.

3. A control system comprising in combination, a main motor for driving a load, means for driving a second load in step with said first load comprising an electrical motion transmitting device driven by said motor, an electrical motion receiving device mechanically connected to said second load and electrically connected to said transmitting device, a master switch for controlling the starting of said main motor while maintaining said transmitting and receiving devices deenergized, a control relay and means controlled thereby for establishing excitation connections for said transmitting and receiving devices, and interlocking means requiring actuation of said master switch to its off position and deenergization of said motor to complete said connections.

4. A control system comprising a motor for driving a load, a master switch and a line contactor controlled thereby for controlling the energization of said motor, means for driving a second load in synchronism with said first load comprising an electrical motion transmitting device driven by said motor, an electrical motion receiving device electrically connected to said transmitting device and mechanically connected to said second load, a control relay and switching means actuated thereby for establishing excitation connections from said transmitting and receiving devices to a supply source, interlocking connections controlled by said relay and said line contactor preventing said actuation except in the off position of said master switch and preventing closing of said line contactor until after establishment of said excitation connections, a time element device for interrupting said excitation connections a predetermined interval of time after establishment, and a contact on said master switch in parallel with said time element device for preventing said interruption of said connections in response to actuation of said master switch within said time interval.

5. A control system comprising in combination, a main driving motor for driving a load, means for maintaining a second load in synchronism with said first load comprising an electrical motion transmitting device driven by said main motor, an electrical motion receiving device mechanically connected to said second load and electrically connected to said transmitting device, starting means for said main motor, a control device and means responsive to actuation thereof for supplying excitation to said transmitting and receiving devices, and a time element for interrupting said excitation a predetermined interval of time after actuation of said control device in the event of non-actuation of said starting means within said time interval.

6. A control system comprising in combination, a main motor for driving a load, means for maintaining a second load in synchronism with said first load comprising an electrical motion transmitting device driven by said motor, an electrical motion transmitting device mechanically connected to said second load and electrically connected to said transmitting device, a master switch having an off position and a running position for starting said main motor, a control device and means responsive to actuation thereof for establishing excitation connections for said transmitting and receiving devices, a time element device responsive to establishment of said connections for interrupting said connections a predetermined interval of time after establishment thereof, and a control circuit in parallel with said time element device established in said running position of said master switch to maintain said excitation connections in response to actuation of said master switch to said running position prior to expiration of said time interval.

GERHART W. HEUMANN.